United States Patent Office 3,187,558
Patented June 8, 1965

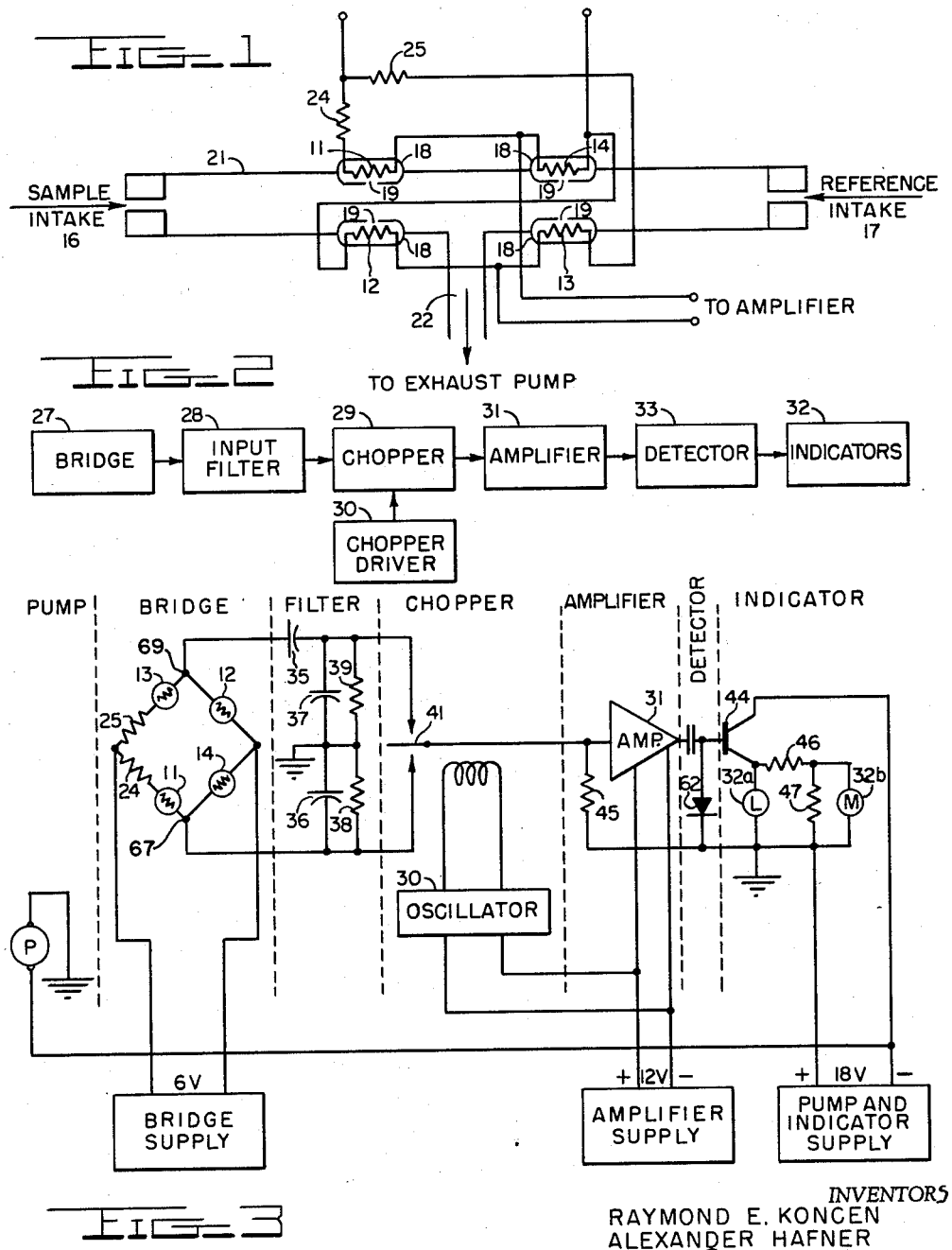

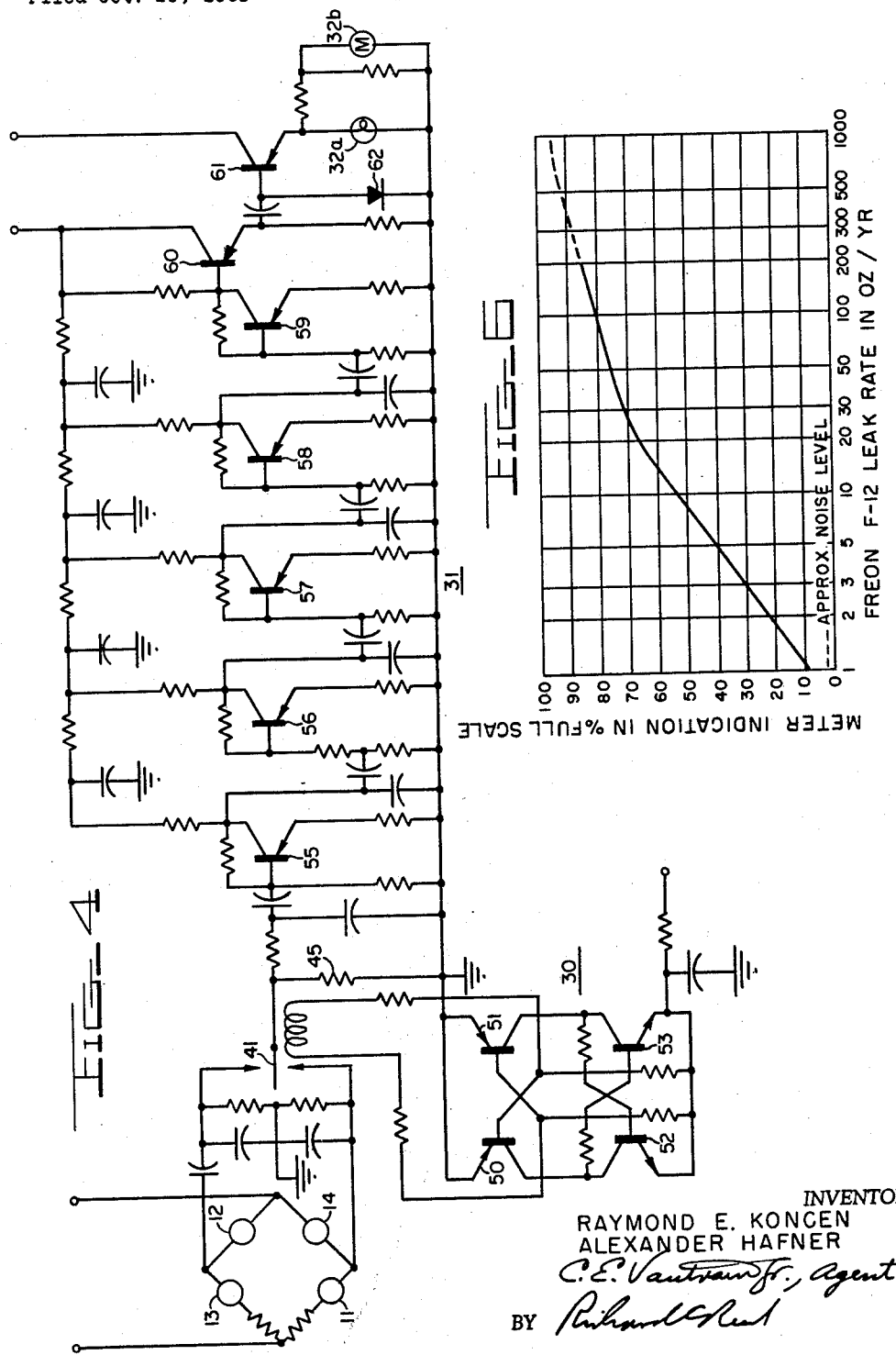

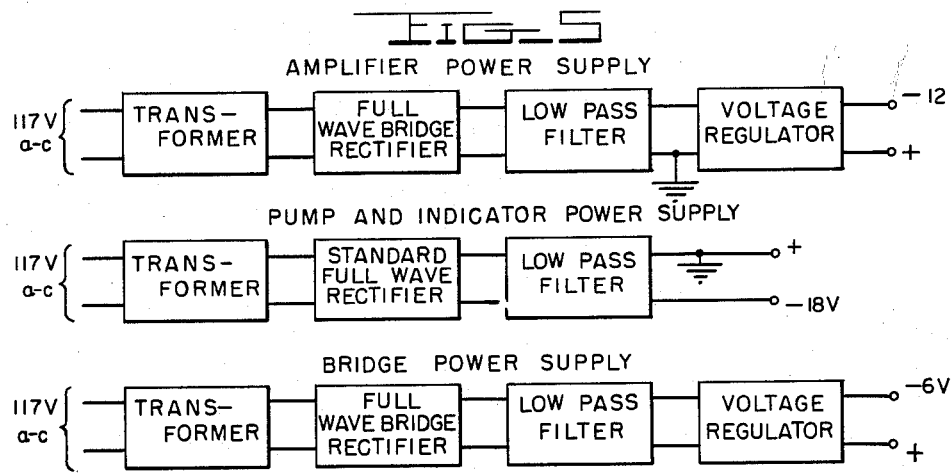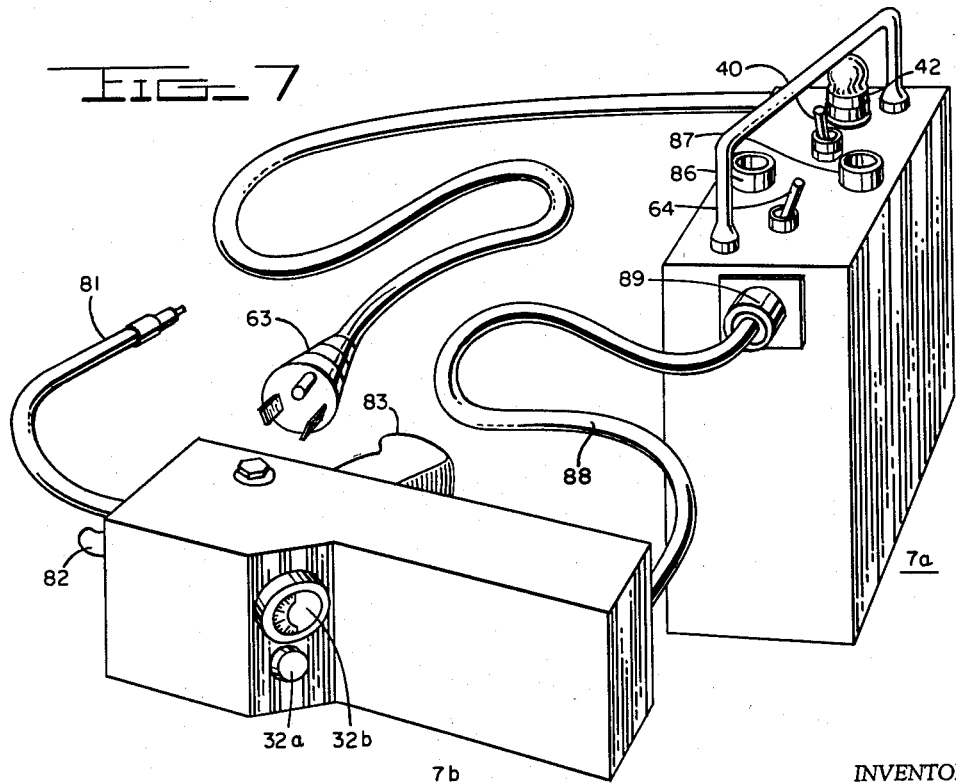

3,187,558
SOLID STATE PORTABLE GAS LEAK DETECTOR
Raymond Earl Koncen, Oxon Hill, Md., and Alexander Hafner, Huntsville, Ala., assignors to the United States of America as represented by the Secretary of the Navy
Filed Oct. 10, 1961, Ser. No. 144,274
5 Claims. (Cl. 73—27)
(Granted under Title 35, U.S. Code (1952), sec. 266)

The invention described herein may be manufactured and used by or for the Government of the United States of America for governmental purposes without the payment of any royalties thereon or therefor.

This invention relates in general to devices for the detection of gases and in particular to such devices which embody a thermal conductivity Wheatstone bridge.

The prior art discloses a variety of gas analyzers using the thermal conductivity bridge. These analyzers generally use a bridge block in which the thermal elements are mounted in cells, some of which contain the gas mixture to be analyzed while others contain a standard reference gas. Other types of gas leak detectors now in use are the mass spectrometer and Pirani tube. There is, however, no leak detector available which is suitable for general purpose leak detection wherein mobility, a moderately high sensitivity, good stability and versatility are required. The leak detectors of the prior art have one or more disadvantages in that they are either too specific, bulky, costly, unstable, unusable in the detection of leaks in spaces where contaminating gases are present, hazardous to use in explosive atmospheres, or limited in portability.

A general purpose portable leak detector is especially needed in the detection of leaks in installations having containers or pipes which carry gas under pressure, such as tanks or bottles of hydrogen, and in the location of dangerous leaks in natural gas installations. An especially important application of a general purpose portable leak detector would be in the location of leaks in refrigeration and air-conditioning equipment. Portability is essential because the leak may be in a confined space, or in an almost inaccessible space. The fact that the space itself is contaminated will cause an indication on most detectors before the leak location can be determined, thereby preventing location of the leak. This is especially true in the case of submarines which are submerged for long cruises of the order of sixty days or longer and wherein it is important to maintain the atmosphere contamination at a low level not detrimental to the health and efficiency of the crew. A frequent source of contamination in such spaces is the leakage of Freon from refrigeration and air-conditioning equipment or carbon dioxide from atmosphere scubbers, and it may be appreciated that to determine the source of leakage in the space in a submarine which itself is a mass of pipes, tubes, cables, equipment, etc., is difficult if not impossible to do with equipment available in the prior art.

Of the gas leak detectors available, the thermal conductivity bridge type lends itself most suitably to a portable detector which should feature simplicity, reliability and ease of operation. The portable gas leak detector must, as well as having the foregoing abilities, be stable, free from drift, have a short warm up period, and have a reasonably fast response to a gas sample.

Accordingly, it is an object of the present invention to provide a general purpose portable gas leak detector.

It is a further object of the present invention to provide a general purpose portable gas leak detector having a relatively high sensitivity combined with good stability.

It is a still further object of this invention to provide a leak detector which is small in size, light in weight, and has a minimum of switches, controls, and adjustments.

It is a further object of this invention to provide a leak detector which is portable, has a reasonably fast response to a gas sample, and is free from drift.

It is a still further object of the present invention to provide a gas leak detector whose sensitivity and life are not affected by ambient concentration of the gas under test.

It is a still further object of this invention to provide a gas leak detector which is portable, is sensitive to any gas having a thermal conductivity different from that of air, and has a minimum of controls.

It is a still further object of the present invention to provide a portable gas leak detector which will locate and give indication of leaks of such a size as to cause a concentration of one or two parts per million contamination in a submarine during long submerged cruises.

Other objects and advantages of this invention will become apparent on a careful consideration of the following description when read in conjunction with the accompanying drawing in which like reference numerals designate like parts throughout the figures thereof and wherein:

FIG. 1 is a schematic diagram of the thermistor bridge assembly of one embodiment of the present invention.

FIG. 2 is a block diagram of the embodiment shown in FIG. 1.

FIG. 3 is a functional diagram of the embodiment shown in FIG. 1.

FIG. 4 is a schematic diagram of the complete embodiment part of which has been shown in FIGS. 1 and 3.

FIG. 5 is a schematic diagram of the power supply used in connection with the embodiment of FIG. 1.

FIG. 6 is a graphical representation of sensitivity of the embodiment shown in FIGS. 1 through 5.

FIG. 7 shows the assembled leak detector of the present invention ready for use.

The leak detector of the present invention is capable of locating leaks in pressurized systems containing any gas having a thermal conductivity different from that of air. The detector does not respond to gas concentration in the ambient air, but only to the change in concentration encountered in the vicinity of a leak. Optimum response time and minimum sensitivity to gas flow rate variation are obtained by using thermistors shielded from the turbulence of the direct gas flow by glass envelopes. The sensitivity of the present invention has been determined as capable of locating Freon F-12 leaks of as small as one or two ounces per year. This detector is both light in weight, small in size and yet exceedingly sensitive to very small concentrations of gas.

The detector is reliable in operation and simple to operate, there being no adjustments necessary, and the detector is ready for use after a short warm-up period.

With reference to FIG. 1, there is shown the thermistor bridge assembly of the invention which includes two pairs of thermistors, 11 and 12, and 13 and 14, connected in opposite branches of a Wheatstone bridge as shown in FIG. 3. Thermistors 11 and 12 are exposed to a portion of the sample gas which is drawn through intake 16, while thermistors 13 and 14 are exposed to a portion of the reference air which is drawn through intake 17. Each thermistor is encased in a glass enclosure 18 having a small opening 19 along passage 21 through which the sample and reference gases are drawn by an exhaust pump (not shown). Passage 21 provides a path for the sample and reference gas to be drawn through, while outlet 22 is connected to the exhaust pump for inducing flow of the gases. Resistors 24 and 25 are wire-wound resistors which are included in the circuit to limit current and provide bridge stability with low noise level. The resistors and supply voltage are chosen to provide a selected bias current for each thermistor. The current which is selected is that necessary to raise the temperature of the thermistors well above ambient temperature. In the embodiment described herein, the operating temperature was selected as approximately 90° C. Thermistors were selected having a resistance of about 200 ohms at 7 milliamperes current. Operating temperature T is obtained from the equation:

$$T = \frac{\ln R_T/R_{25}}{\ln 0.966} + 25$$

where $R_T$ = thermistor resistance at temperature T (° C.)
$R_{25}$ = thermistor resistance at 25° C.

In the embodiment described herein, $R_T$ = 200 ohms and $R_{25}$ = the thermistor resistance at 25° C.

In the embodiment described herein, $R_T$ = 200 ohms and $R_{25}$ = 2000 ohms; thus $$T = \frac{\ln 0.1}{\ln 0.966} + 25$$

The selected operating temperature, in any event, should be sufficiently above ambient temperature so as to not be affected by small temperature differences in the sampled air while maintaining desirable sensitivity to thermal conductivity changes. Operating temperatures should not be so high as to affect appreciably the life of the thermistors or cause chemical dissociations of the gases to be detected or to cause ignition of combustible gases.

The thermistors of the present invention are of a type, commercially produced, in which the filament is glass-enclosed and of the order of ½ inch in length. These thermistors, e.g. such as the D–166382 produced by Western Electric Co., are adapted for use in the present thermal conductivity bridge by carefully heating the glass enclosure until an opening 19 is formed therein by escaping gas. Heat is applied preferably by a gas torch at substantially the center of the glass envelope or enclosure, and is removed immediately upon opening of the glass bubble formed by such heating. The glass is allowed to cool before shaping the opening as desired. This opening is sufficient to permit sample or reference gases to diffuse into the small cavity surrounding the thermistor bead. When a gas having a thermal conductivity less than that of air diffuses in the cavity such gas acts as an insulator around the thermistor bead reducing loss of heat from the thermistor. This reduction of heat loss causes an increase in the thermistor temperature and a consequent decrease in its resistance thereby unbalancing the bridge. The thermistors are cemented in slots in the sampling tube and the reference tube, with the holes 19 placed in close proximity to the gas stream.

The orifice of intake 16 was selected as about 0.070 inch in diameter while that of intake 17 was 0.020 inch in diameter, the former permitting a flow rate of about 0.5 standard cubic feet per hour (s.c.f.h.) while the latter permits a rate of less than 0.1 s.c.f.h. These flow rates result in easy reading of the meter, the intake 16 rate of 0.5 s.c.f.h. giving a response time of the order of slightly more than one second. Smaller orifices may be used and produce slower flow rates which, within limits, provide greater sensitivity. It has been determined that the sensitivity elements and the cavities in which they are mounted provide greater sensitivity and quicker response in an approximate inverse ratio to their size and proximity to the gas stream.

The sensitive elements are preferably small and are securely supported to provide a detector free from the effect of flow rate and orientation or movement. The passage in the vicinity of the elements should be free of irregularities that produce undesirable turbulence. The orifices are preferably positioned a substantial distance, in relation to the size of the thermistors and the openings to each thermistor cavity, from the thermistors so that turbulence and other undesired factors may be minimized. FIG. 1 is generally to scale with respect to thermistor, orifice and passage size and thermistor cavity opening. It will be appreciated that thermistor, thermistor cavity, orifice and passage size may be varied, and that thermistor type and enclosure may be other than those disclosed within the concept of this invention.

FIG. 2 illustrates by block diagram the component parts of the invention. Bridge 27 produces a signal in response to leak detection which is fed to input filter 28 and then to chopper 29. The sample intake gas passing over thermistors 11 and 12 causes bridge unbalance and a voltage to be applied to input filter 28. The filter prevents any constant or slowly changing D.C. bridge voltage from reaching the chopper amplifier, thereby eliminating the need for manual bridge rebalancing. Chopper driver, or oscillator, 30 drives the chopper at a selected rate, in the embodiment described at 400 cycles per second, thereby providing a modulated signal for amplifier 31 to amplify. An amplification of the order of 300,000 times is accomplished after which the signal is demodulated by detector 33, amplified further, and then presented as an indication on indicators 32 which may be a light or meter or both. In the present embodiment both a light and a meter are provided.

In FIG. 3 is shown a functional diagram of the leak detector of the embodiment described herein. The diagram is divided into components according to function, namely pump, bridge, filter, chopper, amplifier, detector, and indicator. A bridge supply of six volts D.-C. is supplied to the Wheatstone bridge, while any unbalance signal from terminals 67 and 69 thereof is filtered by series condenser 35. That is, constant or slowly changing bridge voltages are eliminated. Shunt condensers 36 and 37 and resistors 38 and 39 provide a long decay time constant to filter out random noise of a frequency higher than a few cycles per second, and also provide a relatively long holding time to permit observation of the indication resulting from the relatively short pulse-type signal. Condenser 35 must necessarily be nonpolar, condensers 36 and 37 should also be nonpolar for best operation of the circuit. Oscillator 30, shown in detail in FIG. 4, is a push-pull multivibrator whose output voltage is balanced to ground thereby causing it to drive chopper blade 41 with a minimum of noise. In the embodiment illustrated, the 400 cycles per second chopper has an average equivalent input noise level of 1 microvolt. Oscillator 30 will be described more in detail in connection with the description of FIG. 4. The amplifier power supply in the present embodiment is 12 volts, and the pump and indicator supply 18 volts. Detector 33 provides demodulation of the amplified signal, while resistor 45, preferably a wire-wound resistor wound non-inductively, is included to reduce noise during chopper-off time by providing a low impedance during that time. Resistor 46 is a current limiting resistor while resistor 47 is the shunt resistor of meter 32b. Pilot light 32a completes the components illustrated in FIG. 3.

A complete diagram of the leak detector of the present invention is considered now in relation to FIG. 4. In FIG. 4 there is seen the bridge with thermistors 11, 12, 13 and 14 included thereon, also chopper blade 41, multivibrator 30, and amplifier 31. Multivibrator 30 consists of two PNP transistors 50 and 51 and two NPN transistors 52 and 53 connected as flip-flop and serving as collector loads for the multivibrator. The multivibrator provides, through blade 41, a carrier signal which can be modulated. Amplifier 31 includes six NPN transistors, 55 through 60 in number, with transistors 55 through 59 used as voltage amplifier stages while transistor 60 is used as an emitter follower. The transistors selected are chosen for excellent stability characteristics. Bandpass filtering is provided at input and interstage portions to eliminate both low and high frequency noise and provide amplifier bandpass characteristics which include a response curve having a midband gain of 110 db. The bandpass filtering also reduces 60 cycle hum. The detector portion of the amplifier stage is a voltage doubler type rectifier using germanium diode 62. Transistor 61, which drives the indicator light 32a and meter 32b, is preferably provided with a heat sink so as to prevent thermal runaway. The safeguard of a heat sink is supplied by mounting diode 62 in close thermal contact with the transistor heat sink. This can be provided by having any increase in temperature also result in an increase in diode leakage current thus improving the overall thermal stability of the circuit. Since amplification is of an order of 300,000, it is obvious that the noise level must be maintained as low as possible for all components. In this connection, the chopper and pump motor are magnetically shielded so as to prevent magnetic pickup by the amplifier, the leads from chopper driver 30 to the chopper are individually shielded, ground points within the amplifier are carefully selected to prevent ground loop problems, and a special power supply is necessary to reduce to a minimum noise from the power source.

As shown in FIG. 5, the bridge supply is isolated from ground and from the other two supplies, namely, amplifier supply and pump and indicator supply. The transformers in the power supply are well shielded, however, a single shielded transformer with multiple winding may be used. A three-prong polarized plug 63, shown in FIG. 7, is used in the power cord and a line reversal switch 64, shown in FIG. 7, is provided at the power supply to select the A.-C. line circuit connection providing lowest noise level. The three-prong polarized plug assures proper connection to hot and ground supply lines. Both the amplifier power supply and the pump and indicator power supply are grounded. Full-wave bridge rectifiers are included in the amplifier and bridge power supplies to provide D.-C. having the least deviation from steady flow. A standard full wave rectifier is sufficient for the pump and indicator power supply. Low pass filters are included in each of the power supplies to eliminate 120-cycle ripple disturbance.

FIG. 6 illustrates the sensitivity of the meter of the present invention. The abscissa in the graph for FIG. 6 is the Freon leak rate in ounces per year while the ordinate is meter indication in percent of full scale. As may be seen, the noise level or meter reading with no signal present is approximately 3% of full scale. A leak rate of 3 ounces per year gives a reading of about 30%, while the indicator light gives a noticeably bright output for leaks having rates of about 2 to 3 ounces per year. The graph depicts an evaluation for Freon–12 leaks only, however, it should be realized that the detector is a general purpose device and measurements of gases with other thermal conductivities should provide comparable indications. The device of the present invention has been used successfully to locate leaks in Freon–12, carbon dioxide, oxygen, and natural gas in complex situations and with highly contaminated ambient atmospheres. The curve of FIG. 6 is typical of four units tested, and shows the nominal sensitivity to a calibrated leak of Freon–12 gas.

FIG. 7 is a view of the assembled components of the invention with 7a being the power supply and 7b the detector unit for locating leaks. The sample gas is drawn through probe 81 while reference gas is drawn through tube 82 into the unit in the detector 7b. A pistol type handgrip 83 is provided for firm grip and easy manipulation. As may be noted, there are no controls or adjustments on the detector unit, the only controls being on-off switch 40 and line reversal switch 64 on the power supply. Power-on indicator lamp 42 and fuze access ports 86 and 87 complete the components of the power supply unit. Connecting cable 88 is permanently attached to detector unit 7b and is coupled to power supply unit 7a at plug 89.

To prepare the invention for use it is necessary only to connect the detector unit to the power supply unit, connect the power supply unit to a 117-volt A.-C. power supply, turn on power supply switch 40 and wait about a minute for the components to warm to operating temperature. Line reversal switch 64 may be moved to its alternate position after warm-up to determine the A.-C. line circuit connection having the lowest noise level. The connection of lowest noise level is determined by observing the pointer of meter 32b first with line reversal switch 64 in one position and, after a reading has been obtained, in its other position. The switch position corresponding to minimum pointer reading on the meter scale is the one at which the detector should be operated. It often is noted that there is no significant difference in scale reading between the two switch positions, however, characteristic noise levels of from 3 to 5 percent of scale have generally been encountered.

When noise level has been determined and adjusted for, the detector is ready for use. The blower motor runs continuously thereby drawing ambient air through intakes 16 and 17 and passage 21 continuously. When probe 81 admits gas of a different concentration than that in the ambient air, such gas passes over thermistors 11 and 12 changing the bridge balance and causing a voltage to be applied to input filter 23. Series condenser 35 in the input filter prevents any constant or slowly changing D.-C. bridge voltage from reaching the chopper amplifier thereby eliminating the need for manual bridge rebalancing. Shunt condensers 36 and 37 provide a long decay time constant which filters out random noise of frequencies higher than a few cycles per second, and provides a relatively long holding time to permit observation of the indication of a signal of relatively short pulse. The signal is then modulated at 400 cycles per second by the chopper, amplified about 300,000 times by the bandpass-amplifier, demodulated by the detector, amplified further by transistor 61 and presented as an indication on light 32a and meter 32b. Both indications are vigorous for virtually all leak concentrations, with a leak rate as low as 3 ounces per year giving a meter reading of about 30 percent of full scale. The indicator light shows noticeably bright for leaks having rates as low as about 2 to 3 ounces per year. The small size and light weight of the detector permit it to be carried wherever a person can go, and the length of probe 81 permits playing the probe over areas beyond the reach of a person. Such outstanding flexibility and performance have not been approached by gas detectors of the prior art.

In summary, there is provided a portable gas leak detector which is suitable for use in various environments and has been successfully used in locating leaks in many different kinds of gas systems. The detector of the present invention is sufficiently sensitive to locate Freon–12 leaks as small as 1 or 2 ounces per year, and operation of the detector is not impaired when the ambient air becomes contaminated by gas from the leak.

Many modifications and variations of the present invention are possible pursuant to the above teachings. It is therefore to be understood that its practice is not to be limited by the specific examples in the foregoing description and that this invention is only to be limited by the scope of the appended claims.

What is claimed is:

1. A solid state portable leak detector for determining the location of leaks of gases having a different thermal conductivity than that of air comprising thermal conductivity bridge means for comparing the conductivity of ambient gases with that of gases at a selected point, said bridge means including a gas passage having a reference gas inlet, a sample gas inlet and an outlet, at least a pair of thermistors connected in opposite branches of said bridge means in proximity to gas flow from a respective inlet, said thermistors being positioned along but substantially isolated from said passage such that a limited amount of the gas in said passage will diffuse about respective thermistors, said reference gas inlet and its respective thermistors and said sample gas inlet and its respective thermistors providing a continuous balance condition of said bridge means with respect to ambient gases until such time as gases having a thermal conductivity different from that of the ambient gases enter said sample gas inlet and are diffused about its respective thermistors, filter means for filtering the output of said bridge means so as to block passage of constant or slowly changing bridge voltages, oscillator means for modulating the signal from said filter means, said signal having a given bandwidth amplifier means for amplifying said signal, said amplifier means including filter means for decreasing the bandwidth of said signal, detector means for demodulating the amplified signal, and indicator means for displaying an indication of the presence of said gases having a different thermal conductivity than that of ambient gases.

2. A solid state portable leak detector for determining the location of leaks of gases having a different thermal conductivity than that of air comprising thermal conductivity bridge means for comparing the conductivity of ambient gases with that of gases at a selected point, said bridge means including a gas passage having a reference gas inlet, a sample gas inlet and an outlet, at least a pair of thermistors connected in opposite branches of said bridge means, said thermistors being positioned along but substantially isolated from said passage such that a limited amount of the gas in said passage will diffuse about respective thermistors, filter means for filtering the output of said bridge means so as to block passage of constant or slowly changing bridge voltages, oscillator means for modulating the signal from said filter means, said signal having a given bandwidth amplifier means for amplifying said signal, said oscillator means including impedance means connected to ground from a point intermediate said oscillator means and said amplifier means to reduce noise pickup during oscillator-off time, said amplifier means including filter means for decreasing the bandwidth of said signal, said amplifier means having a plurality of amplification stages, the interstage portion of said stage being capacitively coupled to ground to prevent ground loop disturbances, detector means for demodulating the amplified signal, and indicator means for displaying an indication of the presence of said gases having a different thermal conductivity than that of ambient gases.

3. A solid state portable leak detector for determining the location of leaks of gases having a thermal conductivity different from that of air comprising thermal conductivity bridge means for comparing the conductivity of ambient gases with that of leaking gases at a selected point, said thermal conductivity bridge means including an electrical bridge circuit and a gas passage having a reference gas inlet, a separate sample gas inlet and an outlet, a plurality of thermistors connected to form said bridge circuit, said thermistors being positioned in communication with said passage in such a manner that a small amount of gas entering said reference gas inlet will diffuse about at least one of said thermistors and a small amount of gas entering said sample gas inlet will diffuse about at least another of said thermistors, electrical filter means for filtering the output signal of said bridge circuit so as to block passage of constant or slowly changing bridge voltages, means for modulating the filtered signal from said filter means, said modulating means including a chopper and oscillating means, amplifier means having its input connected to the output of said modulating means for amplifying the modulated signal, impedance means connecting the input of said amplifier means to ground, said impedance means providing a low impedance to reduce noise pickup during quiescent conditions, detector means for demodulating the amplified signal, and indicator means for displaying an indication of the presence of gases having a thermal conductivity different from that of ambient gases.

4. The solid state portable leak detector of claim 3 wherein the filter means includes capacitance means for filtering the output of said bridge to block passage of constant or slowly changing bridge voltages, and R–C filter means connected between said capacitance means and said chopper for providing a long decay time constant thereby lengthening the time of visual indication as well as filtering out random noise.

5. The solid state portable leak detector of claim 4 wherein said oscillating means includes a multivibrator.

References Cited by the Examiner

UNITED STATES PATENTS

| | | | |
|---|---|---|---|
| 1,918,702 | 7/33 | Hebler et al. | 73—27 |
| 2,462,162 | 2/49 | Christensen et al. | 29—155.63 |
| 2,664,486 | 12/53 | Colpitts | 29—155.63 |
| 2,687,036 | 8/54 | Minter | 73—27 |
| 2,702,471 | 2/55 | Vonnegut | 73—29 X |
| 2,751,777 | 6/56 | Cherrier | 73—23 |
| 2,755,999 | 7/56 | Vickers | 73—432 |
| 2,942,188 | 6/60 | Mitchell | 324—118 |
| 3,007,333 | 11/61 | Chadenson | 73—27 |
| 3,011,335 | 12/61 | Skarstrom | 73—26 |
| 3,024,658 | 3/62 | Huddleton | 324—118 X |
| 3,029,628 | 4/62 | Minter | 73—27 |

FOREIGN PATENTS 1,139,596  7/57  France.

OTHER REFERENCES

French Patent 1,220,068, Jan. 4, 1960 (British equivalent is 938,226, Oct. 2, 1963).

Perry, C. C. and Lissner, H. R.: The Strain Gage Primer; McGraw-Hill Book Co.; page 72.

RICHARD C. QUEISSER, *Primary Examiner.*

DAVID SCHONBERG, *Examiner.*